(12) United States Patent
Hamad et al.

(10) Patent No.: US 7,749,596 B1
(45) Date of Patent: Jul. 6, 2010

(54) ENGINEERED CRACK-RESISTANT PAPER AND BOARD

(75) Inventors: Wadood Hamad, Mahwah, NJ (US); Bruce Lyne, Tuxedo Park, NY (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 09/522,359

(22) Filed: Mar. 9, 2000

(51) Int. Cl.
*B32B 7/00* (2006.01)

(52) U.S. Cl. .................... 428/220; 428/195.1; 428/153; 428/158; 162/112

(58) Field of Classification Search ................. 428/195, 428/211, 240, 248, 252, 274, 195.1, 220, 428/153, 158; 162/112
See application file for complete search history.

(56) References Cited

U.S. PATENT DOCUMENTS

| | | | | |
|---|---|---|---|---|
| 3,404,112 A | * | 10/1968 | Lindemann et al. | 524/809 |
| 3,645,952 A | * | 2/1972 | Lindemann et al. | 524/26 |
| 3,716,504 A | * | 2/1973 | Lindemann et al. | 524/26 |
| 3,879,257 A | * | 4/1975 | Gentile et al. | 162/112 |
| 3,903,342 A | * | 9/1975 | Roberts, Jr. et al. | 428/153 |
| 4,158,594 A | * | 6/1979 | Becker et al. | 162/112 |
| 4,161,422 A | * | 7/1979 | Lawson et al. | 162/135 |
| 4,488,932 A | * | 12/1984 | Eber et al. | 162/9 |
| 4,520,062 A | * | 5/1985 | Ungar et al. | 428/148 |
| 4,551,377 A | * | 11/1985 | Elves et al. | 428/137 |
| 4,596,635 A | * | 6/1986 | Warszawski | 204/2 |
| 4,784,917 A | * | 11/1988 | Tawara et al. | 428/441 |
| 5,004,643 A | | 4/1991 | Caldwell | |
| 5,061,545 A | * | 10/1991 | Li et al. | 428/195 |
| 5,209,965 A | | 5/1993 | Caldwell | |
| 5,418,051 A | | 5/1995 | Caldwell | |
| 5,470,434 A | * | 11/1995 | Terasawa et al. | 162/117 |
| 5,620,819 A | * | 4/1997 | Conforti et al. | 430/14 |
| 5,876,792 A | | 3/1999 | Caldwell | |
| 6,010,595 A | * | 1/2000 | Mitchell et al. | 162/129 |

FOREIGN PATENT DOCUMENTS

| | | |
|---|---|---|
| WO | WO 96/12615 A | 5/1996 |
| WO | WO 99/20821 A | 4/1999 |

\* cited by examiner

*Primary Examiner*—David R Sample
*Assistant Examiner*—Lawrence D Ferguson
(74) *Attorney, Agent, or Firm*—Matthew M. Eslami; Thomas W. Barnes, III; Richard C. Stewart, II

(57) ABSTRACT

An engineered crack-resistant paper or board for improved runability formed by depositing a thin discontinuous thermoplastic or thermosetting polymer onto a cellulose fiber network web and having same absorbed into the network in specific geometrical formations. The base sheet thus formed may then be used for various end uses such as packaging, containers, plates, cups, low-weight coated printing grade boards or the like.

26 Claims, 2 Drawing Sheets

ENGINEERED CRACK-RESISTANT PAPER AND BOARD

BACKGROUND OF THE INVENTION

The present invention relates to an engineered crack-resistant paper or board, as well to a process of producing the paper and/or board. More specifically, the present invention relates to a crack-resistant, flaw-carrying paper and/or board that will have excellent runability.

Paper or board being produced with crack resistance, crack retardation, or fracture impedance is a growing requirement for many board or paper coated laminate structures. The structures are formed into various end uses such as containers, board, packaging, ovenable materials, coated paper, and the like. In particular, it is an objective to produce a tougher paper or paperboard.

There does exist prior patents which disclose various coating layers on base sheets. None are directed to impregnation in geometrical formation.

U.S. Pat. No. 2,515,340 addresses the deposition of a polymer layer over an entire web. The objective of the patent is to make paper and paperboard resistant to wet rubbing and to the coloring of coated paper and paperboard in various selected colors.

U.S. Pat. Nos. 5,004,643; 5,209,964; 5,418,051 and 5,876,792 relate to flexible porous webs which contain an internal coating of a silicone polymer composition. The patents discuss the use of pressurized impregnation methods. These patents focus on process related issues and deal with the "heavy saturation or impregnation with a polymer material" within textile, woven type configurations. They concentrate on encapsulating fibers used for forming webs. They do not discuss or suggest improvements in toughness, or mechanical performance of a cellulose fiber network web. The patents disclose rod-like fibers rather than tube-like fibers, on non-woven networks which are the focus of the underlying invention.

On the other hand, it is an objective of the invention to engineer paper and/or board capable of providing superior crack resistance or crack retardation mechanisms, thereby enhancing the product's fracture toughness and structural integrity. More particularly, geometric formations in the form of a thin discontinuous thermoplastic or thermosetting polymer film that penetrates a cellulose fiber network to provide islands that serves as a mechanism for crack retardation and fracture impedance.

It is a further objective of the invention to improve the overall mechanical performance of the paper or paperboard, thus impregnated.

It is another objective of the present invention to produce paper and/or board grades with improved runability and with the minimization or elimination of web failures which arise from the presence of defects in paper and the propagation of cracks.

SUMMARY OF THE INVENTION

According to one embodiment of the instant invention, a thin thermoplastic or thermosetting polymer is deposited onto a cellulose fiber network in geometrical formations. The polymer penetrates the cellulose fiber network web to provide islands that serve as a mechanism for crack retardation. The polymer deposition is applied after the web is formed, i.e., in the dry section.

The polymer is laid onto a base sheet in such a way that it forms a discontinuous impregnated film. The polymer penetrates into the base sheet or web to form a uniform paper or board surface to which a subsequent coating may be applied. The coated paper or board can then be printed upon.

DETAILED DESCRIPTION OF THE PREFERRED EMBODIMENTS

There is disclosed, as a preferred embodiment of the invention, a crack-resistant paper and/or board that has an engineered thin discontinuous thermoplastic or thermosetting polymer material in specific geometric formations impregnated into a cellulose fiber network to provide islands that will serve as a mechanism for crack retardation and fracture impedance. The polymer deposition is applied after the web is formed, i.e., in the dry section. The applied polymer penetrates into the web so as to ultimately form a uniform paper surface to which a subsequent distinct polymer, or other coating may then be applied. The coated paper can then be printed upon. Thus, the invention focuses on crack-resistant base sheets produced through polymer deposition and impregnation, in geometric formations.

The impregnated polymer is formed in different geometries to reduce weight and maximize crack resistance efficiency. The base sheet thus formed may then be coated, printed upon and used for various or desired end uses.

Specifically desired is a tougher paper or board which has improved overall mechanical performance. The thin discontinuous thermoplastic or thermosetting polymer is applied in various geometrical formations such as in thin stripes, equidistant circles, and/or diamond shape formations to define a plurality of discrete areas of said polymer material distributed over said web and forming spaced crack-arresting islands that impede crack propagation in the web while other mechanical properties such as tensile strength and elasticity modulus experience no change. Other patterns are also within the contemplation of the invention. A very thin layer of the thermoplastic or thermosetting polymer is deposited, no more than 5% of the basis weight of the paper, to the surface of the paper after it has been formed. The polymer penetrates into the paper or board in these geometrical formations before an additional coating can be applied. The resultant product can be wound on rolls.

Figure 1:
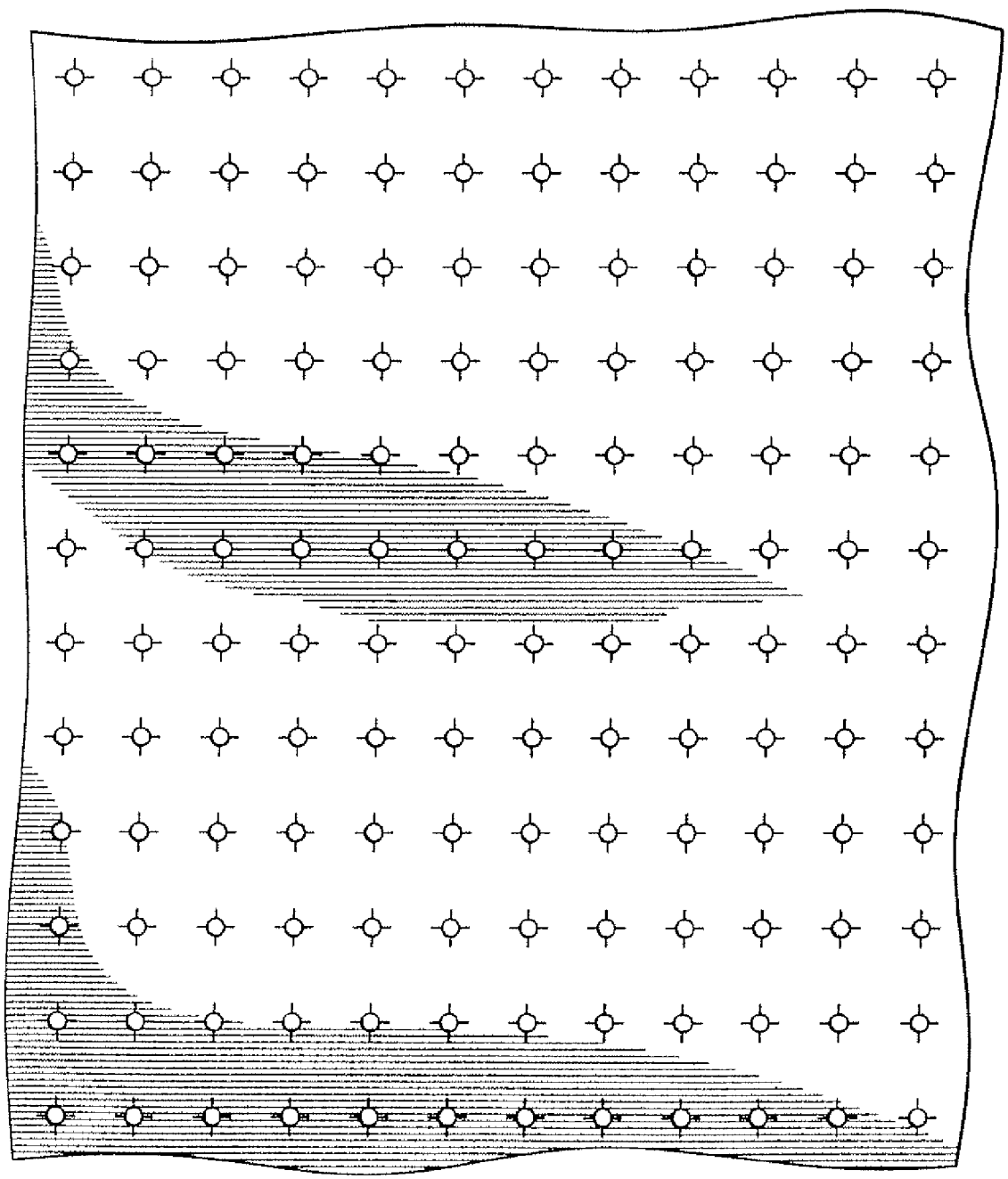
FIG. 1 is a template used to deposit a polymer material in a geometric pattern on a base sheet.

A circular geometrical pattern as depicted in the template of FIG. 1 is one preferred pattern. Specifically, a template is placed on top of a sheet of paper or board and secured in position. A liquid polymeric material is drawn over the template from a well using a brush, scraper, or the like. Accordingly the material will be deposited on the paper or board only at the position of the openings in the template and allowed to dry to provide a discontinuous impregnated film that gives strength to the paper or board.

Two principally distinct advantages may accrue from two different geometries as outlined in the cases below.

One example of a circular template format has 3 mm diameter circles positioned 15 mm apart (center-to-center) to cover the entire sheet. The discontinuous circular reinforcement provides islands that serve as crack arresters or crack retarding mechanisms. Subsequently, the resulting reinforced base sheet possesses an appreciably higher fracture toughness, in both the MD and CD directions. The properties are presented in the table below.

TABLE 1

Results for the non-calendered polymer-impregnated (0.28% solids) base sheets

| Sample | Direction | Basis weight (g/m2) | Caliper (mm) | Fracture toughness (J.m/kg) | % Increase in fracture toughness |
|---|---|---|---|---|---|
| Control (No polymer) | MD | 42.9 | 0.104 | 21.1 | |
|  | CD | 42.9 | 0.104 | 4.25 | |
| 0.28% solids | MD | 41.9 | 0.108 | 26.9 | 27 |
|  | CD | 41.9 | 0.108 | 12 | 182 |

TABLE 2

Results for the calendered polymer impregnated (1% solids) base sheets

| Sample | Direction | Basis weight (g/m2) | Caliper (mm) | Fracture toughness (J.m/kg) | % Increase in fracture toughness |
|---|---|---|---|---|---|
| Control (calendered to 556 pli) | MD | 42.5 | 0.063 | 14 | |
|  | CD | 41.5 | 0.063 | 6.11 | |
| 1% solids (calendered to 556 pli) | MD | 40.5 | 0.067 | 23.1 | 65 |
|  | CD | 40.5 | 0.067 | 8.4 | 37 |

The other mechanical properties (tensile strength, elasticity modulus, stretch to break) experience no change between the control and the polymer-impregnated cases (calendered or not), thereby confirming the initial hypothesis that the polymer circular island serve as mechanisms of crack retardation while maintaining the structural integrity of the sheet.

Figure 2:
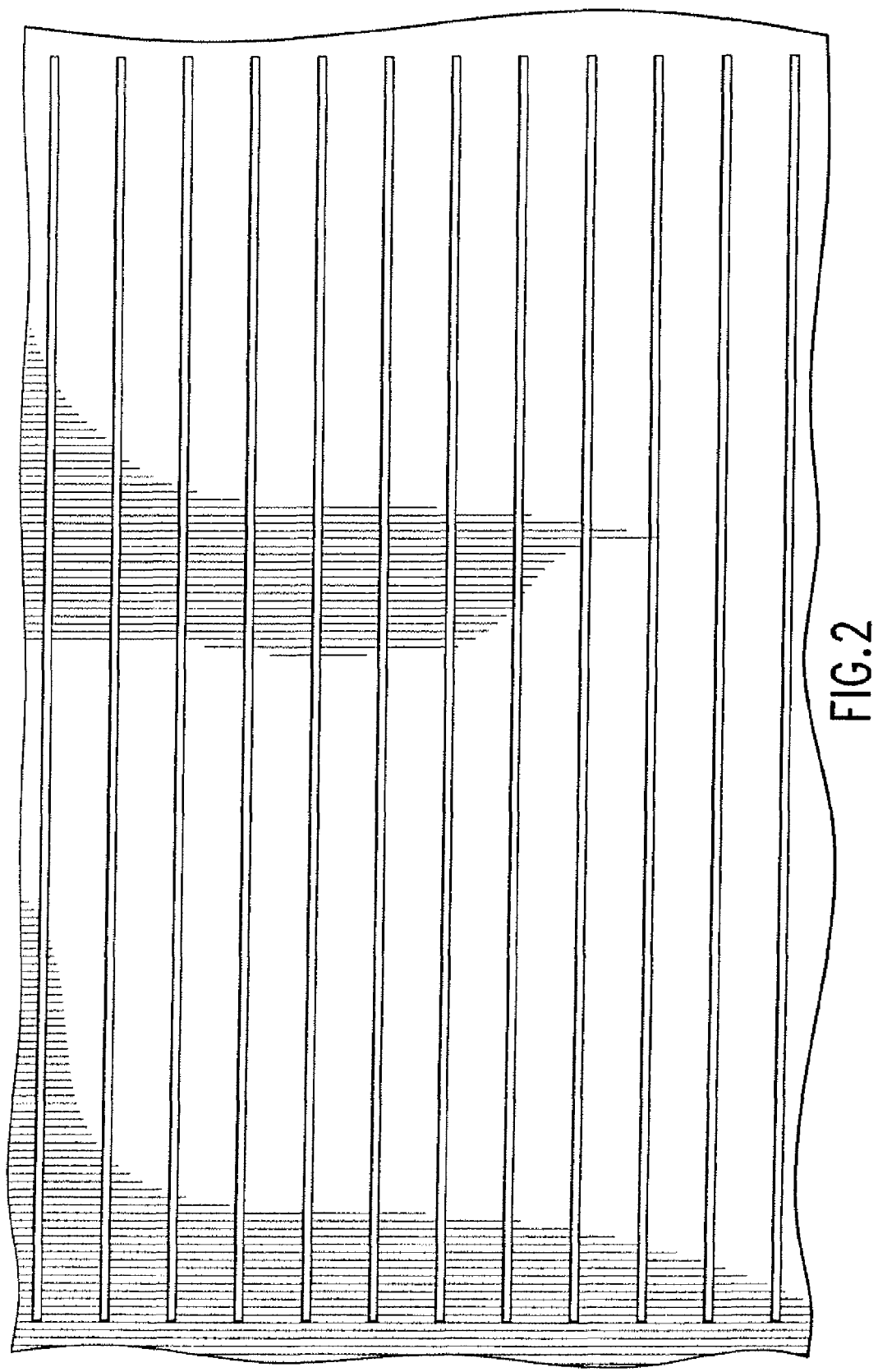
FIG. 2 is an alternate embodiment of a template used to deposit a polymer material in a geometric pattern on a base sheet.

FIG. 2 depicts a rectangular template format: The polymer is applied similarly to what is discussed above along 2 mm-wide stripes spanning the length of the sheet. A base sheet thus impregnated provides superior ductility in the MD direction and improved fracture toughness in the CD direction (with respect to the control—see above). The values are as follows:

| Sample | Ductility—MD (J/g) | Fracture toughness—CD (J.m/kg) |
|---|---|---|
| 0.28% solids | +42% | +250% |
| 1% solids | +31% | 117% |

Again the remaining mechanical properties (tensile strength, stretch, stiffness and elasticity modulus) exhibit no discernible change with respect to the control.

Templates are only one mechanism of depositing the thermoplastic or thermosetting materials onto the board or paper in geometrical formations. Any other mechanism for such is within the scope of the invention.

Materials such as diene-based rubbers which can be produced by emulsion polymerization, namely poly-butadiene, acrylonitrile-butadiene, ethylene vinyl acetate-butadiene and styrene-butadiene are all suitable polymers for the thin discontinuous thermoplastic polymer material. In addition, other polymers such as latex blends, copolyesters such as polyhydroxybutyrate and butanoate or cellulose acetate butyrate are also envisioned for the material. Further, it is possible to use various acrylics or polyesters including liquid crystalline polymers for the impregnation material.

Up until the invention described herein, there have been no processes for depositing and impregnating a thin discontinuous thermoplastic or thermosetting material into a dry cellulose fiber network web to serve as toughness and stiffness enhancers with the objective of producing a paper or board grade with trouble free runability. This technique improves runability and minimizes or eliminates web failures arising from the presence of defects in paper and the propagation of cracks.

As described hereinabove, the present invention comprises a crack-resistant paper or board made from a pre-formed web of cellulose fibers with a thin film of polymer material deposited onto the web in a discontinuous geometric pattern and impregnated into the web to form a plurality of spaced apart discrete areas distributed over said web, said polymer-impregnated areas forming crack-arresting islands that impede crack propagation and fracturing in said web without changing other properties of the paper or board, such as the modulus of elasticity and tensile strength. The polymer material penetrates into the web to form a substantially uniform flush surface for subsequent treatment such as coating and printing.

The present invention may be embodied in other specific forms without departing from the spirit or essential attributes thereof, and accordingly, reference should be made to the appended claims, rather than to the limits of the foregoing specification, as indicating the scope of the invention.

What is claimed is:

1. A crack-resistant printing paper or board comprising a pre-formed cellulose fiber network web having a thickness; and a polymer material applied to a surface of the web in thin discontinuous geometrical formations to define a plurality of discrete areas of said polymer material distributed over said web and forming spaced crack-arresting islands that impede crack propagation in said web; said polymer material impregnated throughout the thickness of said web so that said surface of the paper or board is uniform and suitable for subsequent coating and printing, wherein the polymer material is no more than 5% of the basis weight of the paper or board.

2. The crack-resistant paper or board as claimed in claim 1, wherein the polymer material is a thermoplastic or thermoset material.

3. The crack-resistant paper or board as claimed in claim 1, wherein the geometrical formations are rectangular stripes, equi-distant circles or diamond-shape formations.

4. The crack-resistant paper or board as claimed in claim 1, wherein the polymer is selected from the group consisting of a latex blend, an acrylic polymer, a polyester resin and a liquid crystalline polymer.

5. The crack-resistant paper or board as claimed in claim wherein a subsequent distinct polymer material is coated on said surface of the paper or board.

6. The crack-resistant paper or board as claimed in claim 1 wherein the polymer is selected from the group consisting of diene-based rubber, acrylics, latex blends, polyesters and any combination thereof.

7. The crack-resistant paper or board as claimed in claim 1 wherein said fibers are pulp fibers.

8. The crack-resistant paper or board as claimed in claim 3 wherein the geometrical formations are rectangular stripes.

9. The crack-resistant paper or board as claimed in claim 3 wherein the geometrical formations are equi-distant circles.

10. The crack-resistant paper or board as claimed in claim 3 wherein the geometrical formations are diamond-shape formations.

11. The crack-resistant paper or board as claimed in claim 1, wherein the paper or board comprises calendered paper or board.

12. The crack-resistant paper or board as claimed in claim 5, wherein the coated surface of the paper or board comprises print.

13. The crack-resistant paper or board as claimed in claim 1, wherein the cellulose fiber network web comprises pulp fibers.

14. A crack-resistant printing paper or board comprising a cellulose fiber network web having a thickness; and a thin film of a polymer material deposited onto a surface of the web in discontinuous geometrical formations to form a plurality of discrete areas distributed over said web that are impregnated with said polymer material and form spaced crack-arresting islands that impede crack propagation in said web; said polymer material impregnated throughout the thickness of said web so that said surface is uniform and suitable for subsequent coating and printing, wherein the polymer is selected from the group consisting of poly-butadiene, acrylonitrile-butadiene, ethylene vinyl acetate-butadiene, polyhydroxybutyrate-butanoate and a cellulose acetate butyrate, wherein the polymer material is no more than 5% of the basis weight of the paper or board.

15. The crack-resistant paper or board as claimed in claim 14, wherein the paper or board comprises calendered paper or board.

16. The crack-resistant paper or board as claimed in claim 14, wherein a subsequent distinct polymer material is coated on said surface of the paper or board.

17. The crack-resistant paper or board as claimed in claim 16, wherein the coated surface of the paper or board comprises print.

18. A crack-resistant paper or board consisting essentially of a cellulose fiber network web having a thickness; and a thin layer of a polymer material deposited onto a surface of the web and impregnated in the web in discontinuous geometrical formations to define a plurality of discrete areas distributed over said web that are impregnated with said polymer material and form spaced crack-arresting islands that impede crack propagation in said web, said polymer material impregnated throughout the thickness of said web so that said surface is uniform, wherein the polymer material is selected from the group consisting of diene-based rubber, acrylics, latex blends, polyesters and any combination thereof and is no more than 5% of the basis weight of the paper or board.

19. The crack-resistant paper or board as claimed in claim 18, wherein the geometrical formations are rectangular stripes, equi-distant circles or diamond-shape formations.

20. The crack-resistant paper or board as claimed in claim 18, wherein a subsequent distinct polymer material is coated on said surface of the paper or board.

21. The crack-resistant paper or board as claimed in claim 18 wherein said fibers are pulp fibers.

22. The crack-resistant paper or board as claimed in claim 19 wherein the geometrical formations are rectangular stripes.

23. The crack-resistant paper or board as claimed in claim 19 wherein the geometrical formations are equi-distant circles.

24. The crack-resistant paper or board as claimed in claim 19 wherein the geometrical formations are diamond-shape formations.

25. The crack-resistant paper or board as claimed in claim 20, wherein the coated surface of the paper or board comprises print.

26. A crack-resistant paper or board comprising:
- a pre-formed web of cellulose fibers having a thickness;
- a thin film of polymer material deposited onto said web in a discontinuous geometric pattern and impregnated into said web to form a plurality of spaced apart discrete areas distributed over said web, said polymer-impregnated areas forming crack-arresting islands that impede crack propagation and fracturing in said web without adversely affecting the modulus of elasticity and tensile strength of the paper or board; and
- said polymer material impregnated throughout the thickness of said web to form a substantially uniform flush surface for subsequent treatment such as coating and printing.

\* \* \* \* \*